Patented Aug. 29, 1933

1,924,769

UNITED STATES PATENT OFFICE 1,924,769

PROCESS FOR THE PRODUCTION OF CARBOXYLIC ACIDS

Gilbert B. Carpenter, Bellemoor, Del., assignor to E. I. du Pont de Nemours & Company, Wilmington, Del., a corporation of Delaware No Drawing. Application August 24, 1931
Serial No. 559,127

7 Claims. (Cl. 260—114)

This invention relates to a process for the preparation of formic acid from carbon monoxide and steam and is directed particularly to the use of a new catalyst for the reaction.

It has been known that carbon monoxide and steam will react, in the presence of a suitable catalyst, to give formic acid. As this process is one which employs raw materials that are relatively inexpensive, it should, under favorable conditions, produce the acid at an exceptionally low cost. Its commercial success, however, will in no small part be determined by the catalyst used. Those which have been proposed heretofore have not been entirely satisfactory for commercial operation due to low yield, short life, and other economic considerations. Efforts of investigators in this art have been directed, therefore, to the discovery of catalysts having high activity and which, furthermore, favor the production of formic acid while tending to inhibit the formation of undesirable side products.

An object of the present invention is to provide new catalysts for the preparation of formic acid from carbon monoxide and steam having the above desirable characteristics. Other objects will hereinafter appear.

According to the present invention formic acid can be prepared from carbon monoxide and steam by passing a mixture of these gases over a catalyst which comprises a halide of an alkaline earth or alkali metal viz calcium, barium, strontium, magnesium, sodium, potassium, cæsium, rubidium, and lithium. While the chlorides, and bromides of these elements may be used I prefer to employ the iodides thereof. Other halides which may be used include the halides of tin, iron, cobalt, nickel, bismuth, manganese, lead, titanium, zinc, and cadmium. I prefer also to use these last named elements as iodides. These catalysts may be used alone or as admixtures and may be either unsupported or supported upon the usual type of catalyst support such, for example, as activated charcoal, fuller's earth, kieselguhr, etc.

The carbon monoxide required for this synthesis may conveniently be derived from various commercial sources, such as, for example, water-gas, producer gas, etc., by liquefaction or other methods, and should likewise for the best results be relatively pure.

Inert gases, such as nitrogen, carbon dioxide, etc., may be included with the reactants, this being advantageous in some cases from the standpoint of controlling the temperature of the exothermic reaction and of limiting the extent thereof, or it may be desired to restrict the overall conversion of the reaction for the sake of enhancing the relative yield of formic acid.

I prefer generally to conduct the reaction at pressures in excess of atmospheric, say from 25—900 atmospheres. The reaction proceeds over a wide range of temperatures employing the above described catalysts, depending upon the gaseous composition employed. Generally the desired conversion of the carbon monoxide and steam to formic acid can be obtained at a temperature of from 100-400° C. although I prefer to conduct the reaction in the range of from 200-300° C.

The following examples will illustrate one method of practising the invention, although the invention is not limited thereto.

*Example 1.*—100 parts of a gaseous mixture containing, by volume, 93% carbon monoxide, and 7% hydrogen, carbon dioxide, nitrogen etc., was passed together with 20 parts of steam over a calcium iodide catalyst supported on activated charcoal. This catalyst was prepared by washing activated charcoal with hot 1:1 hydrochloric acid, and after drying, soaking the thus treated charcoal with an aqueous solution of calcium iodide whereby the charcoal, after drying at approximately 125° C. contains about 20% by weight of calcium iodide. The temperature during the synthesis was maintained at approximately 325° C. and the pressure at 700 atmospheres. A good yield of formic acid was obtained.

*Example 2.*—Using a sodium bromide catalyst and the same gaseous mixture as well as temperature, and pressure conditions of Example 1, a good conversion of carbon monoxide to formic acid results.

The apparatus which may be employed for conducting the reaction may be of any conventional type and preferably one in which the temperature of exothermic reactions can be readily controlled at the desired temperature. Owing to the corrosive action of formic acid, the interior of the converter and conduits therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, manganese, or nickel.

Various changes may be made in the method of employing the above catalysts for the preparation of formic acid from carbon monoxide and steam without departing from this invention or sacrificing the advantages that may be derived therefrom.

I claim:

1. In a process of producing formic acid from a gaseous mixture containing carbon monoxide and steam the step which comprises passing the gaseous mixture over the halide of an element selected from the group consisting of the alkali and alkaline earth elements.

2. In a process of producing formic acid from a gaseous mixture containing carbon monoxide and steam the step which comprises passing the gaseous mixture over the halide of an element selected from the group of basic elements having an atomic weight of from 6 to 209 consisting of calcium, barium, strontium, magnesium, sodium, potassium, cæsium, rubidium, lithium, tin, iron, cobalt, nickel, bismuth, manganese, lead, titanium, zinc and cadmium.

3. In a process of producing formic acid from a gaseous mixture containing carbon monoxide and steam the step which comprises passing the gaseous mixture over the iodide of an element selected from the group consisting of the alkali and alkaline earth elements.

4. In a process of producing formic acid from a gaseous mixture containing carbon monoxide and steam the step which comprises passing the gaseous mixture over the iodide of an element selected from the group of basic elements having an atomic weight of from 6 to 209 consisting of calcium, barium, strontium, magnesium, sodium, potassium, cæsium, rubidium, lithium, tin, iron, cobalt, nickel, bismuth, manganese, lead, titanium, zinc and cadmium.

5. In a process of producing formic acid from a gaseous mixture containing carbon monoxide and steam the step which comprises passing the gaseous mixture over a calcium iodide catalyst.

6. In a process of producing formic acid from a gaseous mixture containing carbon monoxide and steam the step which comprises passing the gaseous mixture over a sodium bromide catalyst.

7. In a process of producing formic acid from a gaseous mixture containing carbon monoxide and steam the step which comprises passing the gaseous mixture over a calcium chloride catalyst.

GILBERT B. CARPENTER.